United States Patent
Beyzavi et al.

(10) Patent No.: US 6,352,572 B1
(45) Date of Patent: Mar. 5, 2002

(54) PROCESS FOR THE THERMAL TREATMENT OF GRANULATED IRON ORE PRIOR TO THE REDUCTION

(75) Inventors: Ali Beyzavi, Frankfurt am Main; Martin Hirsch, Friedrichsdorf, both of (DE)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/403,921
(22) PCT Filed: Apr. 17, 1998
(86) PCT No.: PCT/EP98/02298
 § 371 Date: Feb. 18, 2000
 § 102(e) Date: Feb. 18, 2000
(87) PCT Pub. No.: WO98/49352
 PCT Pub. Date: Nov. 5, 1998

(30) Foreign Application Priority Data
Apr. 30, 1997 (DE) .......................... 197 18 136

(51) Int. Cl.$^7$ ............................. C21B 13/00
(52) U.S. Cl. ............... 75/433; 75/444; 75/751; 75/765
(58) Field of Search .................. 75/444, 433, 751, 75/765

(56) References Cited

U.S. PATENT DOCUMENTS

| 3,160,498 | A | * | 12/1964 | Olt et al. ............... 75/444 |
| 4,255,185 | A | | 3/1981 | Schulte et al. |
| 5,527,379 | A | | 6/1996 | Hirsch et al. |
| 5,560,762 | A | | 10/1996 | Bresser et al. |
| 5,603,748 | A | | 2/1997 | Hirsch et al. |

FOREIGN PATENT DOCUMENTS

| DE | 28 00 211 A | 7/1979 |
| DE | 44 37 549 A | 4/1996 |
| GB | 981 231 A | 1/1965 |
| GB | 1 127 145 A | 9/1968 |

\* cited by examiner

Primary Examiner—Melvyn Andrews
(74) Attorney, Agent, or Firm—Norris McLaughlin & Marcus

(57) ABSTRACT

The wet granulated iron ore is initially conducted through a drying zone. The ore leaves the drying zone at a temperature of 120–400° C. The ore is then heated in direct contact with hot gas to temperatures of 700–1,100° C. before being delivered to a reduction zone. The ore coming out of the drying zone is fully or partially guided through a separating device so as to separate the ore into fine and coarse grain fractions. The fine-grained ore fraction is conveyed to a granulating device so as to produce an iron ore granulate which is conducted to the drying zone. The coarse-grained ore fraction is heated to temperatures of 700–1,100° C. before it is guide into the reduction zone.

8 Claims, 1 Drawing Sheet

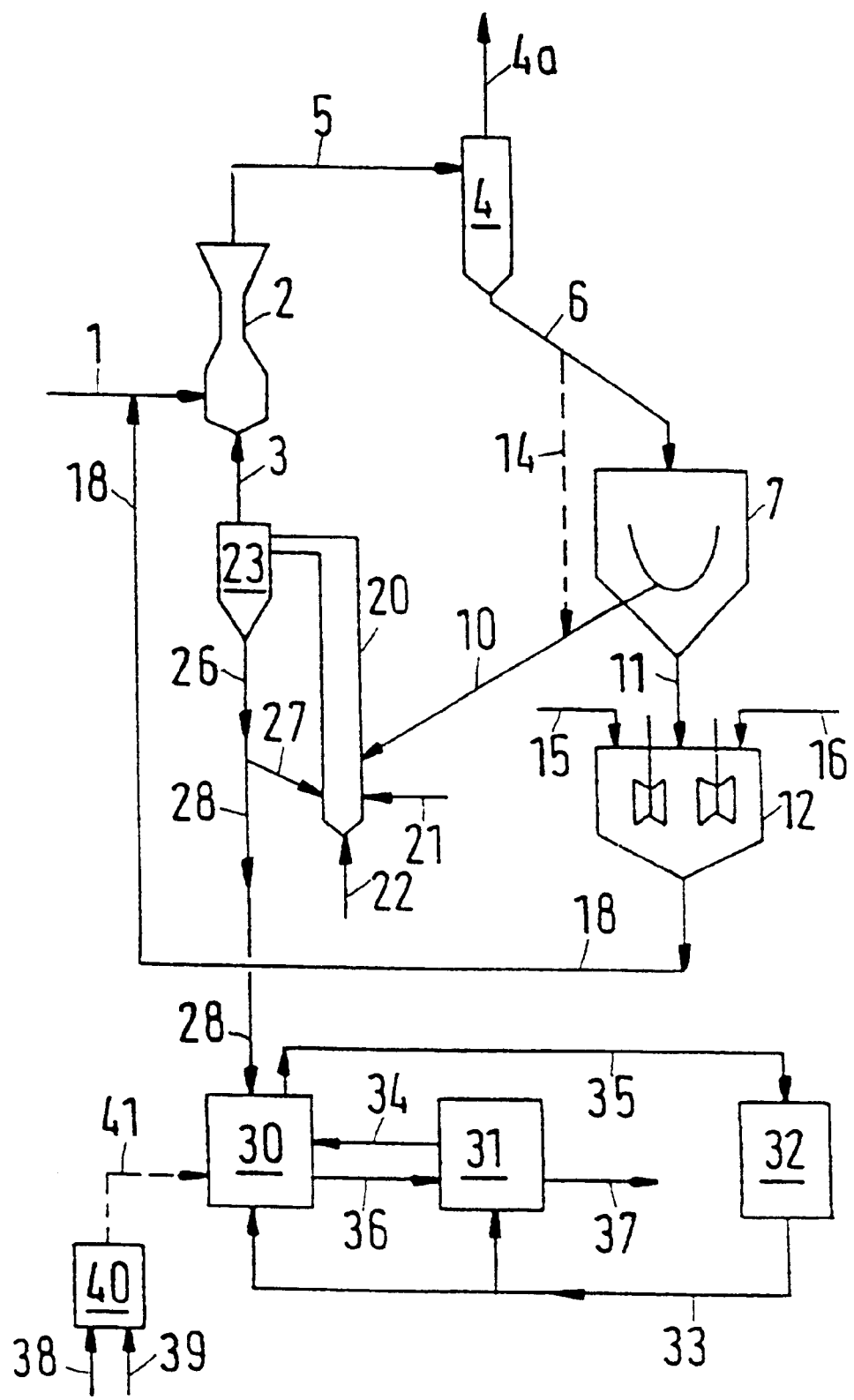

PROCESS FOR THE THERMAL TREATMENT OF GRANULATED IRON ORE PRIOR TO THE REDUCTION

DESCRIPTION

This application is a 371 of PCT/EP98/02298, which was filed on Apr. 17, 1998.

This invention relates to a process for the thermal treatment of granular, moist iron ore, where the ore is passed through a drying zone, and where the ore, which comes from the drying zone with a temperature in the range from 120 to 400° C., is heated in direct contact with hot gas to temperatures of 700 to 1100° C., before it is charged into a reduction zone.

Such processes are known and described for instance in the U.S. Pat. Nos. 5,527,379; 5,560,762; and 5,603,748. In this case, the thermal treatment serves the preparation of the ore for being charged into a reduction plant, which operates with one or more fluidized beds. As fluidizing gas, gas rich in hydrogen is used, which as a further reducing component may also contain carbon monoxide. It was found out that ore components with a particularly fine grain disturb the reduction process and reduce the quality of the product, because these fine-grained components are easily blown out of the fluidized bed. As a result, their dwell time in the reduction zone is reduced such that they are no longer reduced sufficiently.

It is the object underlying the invention to ensure that during the thermal pretreatment of the iron-containing ore or an ore concentrate the ore introduced into the reduction zone does not contain any disturbing amounts of fine grain. In accordance with the invention this object is solved in the above-mentioned process in that the ore coming from the drying zone is wholly or partly passed through a separating means, and a coarse-grained ore fraction is separated from a fined-grained ore fraction, that the fine-grained ore fraction is charged into a granulating means and an iron ore granulate is produced, which is introduced into the drying zone, and that the coarse-grained ore fraction is heated to temperatures of 700 to 1100° C., before it is introduced into the reduction zone. The separating means may for instance be a screen or a sifter.

Particularly fine-grained ore, which is undesired in the reduction plant, is obtained in several ways. On the one hand, fines are formed during the drying and heating of the granular ore, and there is also formed fine grain owing to the sputtering of coarser grains during heating. Furthermore, the crude ore, which is provided for the reduction in the fluidized bed, is crushed even before drying to the optimum grain size of about 0.1 to 3 mm. To this end, rolling presses known per se may be used for instance, but there is inevitably also produced ore with an extremely fine grain size. Screening and granulating this fine-grained component prior to drying, as it is proposed for instance in U.S. Pat. No. 5,560,762, does not completely solve the problem of fine grain, because fine grain is also formed again during drying and the thermal pretreatment as a result of abrasion and sputtering. By means of the process in accordance with the invention it is efficiently and economically ensured that no disturbing amounts of fine grain can get into the reduction plant.

It is usually provided that the ore coming from the drying zone is introduced into the separating means for at least 50%, in order to separate the fine-grained ore fraction. In, the separating means it should expediently be made sure that the separated fine-grained ore fraction has grain sizes of not more than 0.2 mm for at least 80 wt-%. Preferably, the ore granules withdrawn from the granulating means have grain sizes of at least 0.3 mm for at least 50 wt-%. When a finegrained fraction is sifted off from the crude ore already before drying, this crude fine ore may also be charged into the existing granulating means. The crude fine ore will usually have grain sizes of not more than 0.2 mm for at least 80 wt-%.

The ore charged into the reduction plant will usually consist of grain sizes in the range from 0.1 to 3 mm for at least 80 wt-%. This is recommended above all when the first reduction stage is designed as circulating fluidized bed, as it is the case in the known processes of the above-stated U.S. Patents. In the circulating fluidized bed, relatively high gas velocities of the fluidizing and reduction gas are employed, and the empty-conduit velocities of the gas usually lie in the range from 3 to 10 m/s. This first reduction stage as described above is expediently followed by a second reduction stage, in which the fluidized bed is held in the state of the dense phase. In this case, the empty-conduit velocities of the fluidizing and reduction gas lie in the range from 0.3 to 1 m/s.

Embodiments of the process will now be explained with reference to the drawing, which represents a flow diagram of the process.

Via line 1, granular moist iron ore or also ore concentrate is supplied and charged into a Venturi drier 2. The ore usually has an Fe content of at least 60 wt-%. The ore, which for instance was first passed through a not represented crushing device, has grain sizes up to not more than 10 mm, preferably not more than 6 mm. Advantageously, at least 80 wt-% of the ore of line 1 should have grain sizes of not more than 4 mm. Hot gas is supplied to the drier 2 through line 3, so that the ore is conveyed to the top, dried and charged into a cyclone 4 through line 5. Gas containing water and dust is withdrawn via line 4a and introduced into a not represented dedusting unit. Dried ore, whose temperatures usually lie in the range from 120 to 400° C., leaves the cyclone 4 through line 6 and gets into a separating means, which in the present case is designed as sifter 7. The coarse-grained fraction leaves the sifter 7 through line 10, and the finegrained ore fraction is supplied through line 11 to a granulator 12. When not the entire dried ore from the cyclone 4 should be introduced into the sifter 7, a partial quantity thereof may directly be admixed to the coarse fraction of line 10 through the bypass line 14 indicated in broken lines.

If necessary, binder such as bentonite is supplied to the granulator 12 through line 15. Furthermore, a filter cake may be charged into the granulator through line 16, which filter cake originates from a not represented gas cleaning unit and is rich in fine-grained iron ore. The granulator 12 known per se produces an iron ore granulate, where at least 50 wt-% of the granulate have grain sizes of at least 0.3 mm. This granulate is introduced into the drier 2 on the path 18.

The coarse ore fraction of line 10 is heated to temperatures of 700 to 1100° C. and mostly not more than 1000° C. For this purpose a circulating fluidized bed is used, to whose reactor 20 a solid, liquid or gaseous fuel is supplied through line 21, and air is supplied through line 22. The hot combustion gases convey the solids upwards to a cyclone separator 23, where the hot, dust-laden gases are supplied to the drier 2 through line 3. The heated coarse ore leaves the cyclone 23 through line 26 and is partly recirculated to the lower part of the chamber 20 through line 27. The remaining ore, which has been hardened as a result of heating, is supplied to the reduction plant through line 28.

The reduction plant schematically illustrated in the drawing comprises a first reduction stage 30, a second reduction stage 31 and a gas processing unit 32. In the first stage 30, a circulating fluidized bed is employed, and the second reduction stage 31 is designed as stationary fluidized bed. Details of such a reduction plant are described in the U.S. Pat. Nos. 5,527,379; 5,560,762 and 5,603,748. Hot reduction gas, which in addition to hydrogen may also contain carbon monoxide, is supplied via line 33 and as fluidizing gas partly supplied to the first stage 30 and the second stage 31. Exhaust gas o f the second stage 31 is supplied to the first stage 30 through line 34. The exhaust gas containing steam and dust, which leaves the first stage 30 via line 35, is recirculated to the plant 32 for processing and partial reuse, in which plant there is also produced fresh reduction gas. The ore partly reduced in the first stage 30 is delivered through line 36 to the second stage 31 for the further reduction, and finished product is withdrawn via line 37 and usually supplied to a not represented briquetting and cooling unit.

If it is desired to also process coal during the reduction, fine-grained coal is charged through line 38 together with $O_2$-containing gas from line 39 to a coal gasification plant 40 known per se, and through partial oxidation a product gas containing $H_2$ and CO is produced. This product gas may like-wise be introduced into the first reduction stage 30 through line 41 indicated in broken lines.

EXAMPLE

In a plant corresponding to the drawing without line 14 and without the reduction plant, a hematitic fine ore with an Fe content of 68.5 wt-% is subjected to a thermal treatment. The ore has a water content of 7 wt-%. 100 t/h of this ore are charged into the Venturi drier 2, which ore has been crushed to grain sizes smaller than 3 mm. All quantities refer to dry solids, unless otherwise indicated. Gas of 900° C. is supplied to the drier 2 through line 3, and 26 t/h ore granulate with a water content of 8.5 wt-% are supplied to the drier through line 18. Dried ore is withdrawn through line 5 in an amount of 126 t/h with a temperature of 250° C. The air classifier 7 is operated with circulating air, so that there is no gas in-let and outlet. The coarse-grained fraction, which has a lower grain boundary of 0.1 mm, is passed through line 10 in an amount of 106,5 t/h, the fine-grained ore is supplied to the granulator 12 in an amount of 13 t/h. At the same time, 3100 kg/h water, 104 kg/h bentonite and 11.7 t/h of a filter cake are charged into the granulator. The filter cake, which originates from gas cleaning processes, comprises 90 wt-% iron ore and 10 wt-% water. The granulator produces 26 t/h micropellets with 8.5 wt-% water, a maximum grain size of 3 mm, an average grain size ($d_{50}$) of 0.4 mm, and with a component smaller than 0.1 mm of 5 wt-%. These micropellets are supplied to the drier 2 on the path 18.

Into the reactor 20, 4536 Nm³/h natural gas and 46600 Nm³/h air are introduced, so that a temperature of 900° C. exists in the reactor. In line 28, 106.5 t/h hardened granular iron ore are provided for the reduction plant.

What is claimed is:

1. A process for the thermal treatment of granular, moist iron ore prior to the reduction thereof, which comprises drying the moist ore by passing it through a drying zone, and heating the ore in said drying zone to a temperature in the range from 120 to 400° C., and then separating at least a portion of said dried ore into a course-grained fraction and a fine-grained fraction in a separator, passing the fine-grained fraction to a granulator and granulating it to form a granulate, and recycling said granulate to the drying zone; combining said course-grained fraction with the remaining portion of said dried ore, if any, heating said course-grained ore, together with said remaining portion of dried ore, if any, to a temperature of from 700 to 1100° C. by direct contact with hot gas and introducing the heated course-grained ore, together with said remaining portion of dried ore, if any, into a reduction plant for the reduction thereof.

2. The process of claim 1, wherein said at least a portion of said dried ore is at least 50 wt %.

3. The process of claim 1 wherein said hot gas is a gas produced by the combustion of solid, liquid or gaseous fuel.

4. The process of claim 1 further comprising the step of crushing the moist iron ore before passing it through the drying zone.

5. The process of claim 1, wherein at least 80 wt % of said fine-grained fraction has a grain size of not more than 0.2 mm.

6. The process of claim 1, wherein at least 50 wt % of said granulate has a grain size of at least 0.3 mm.

7. The process of claim 1, wherein, in addition to said at least a portion of said dried ore, iron-containing ore of which an at least 80 wt % fraction has a grain size of not more than 0.2 mm, is charged directly into the granulator.

8. The process of claim 1 wherein said reduction plant has at least one fluidized bed and a supply of hot, reducing fluidizing gas.

* * * * *